(12) United States Patent
McGriff (10) Patent No.: US 10,456,896 B2
(45) Date of Patent: Oct. 29, 2019

(54) COMPACT PULLEY PULLER

(71) Applicant: Roy McGriff, Ponte Vedra, FL (US)

(72) Inventor: Roy McGriff, Ponte Vedra, FL (US)

( * ) Notice: Subject to any disclaimer, the term of this patent is extended or adjusted under 35 U.S.C. 154(b) by 0 days.

(21) Appl. No.: 16/248,060

(22) Filed: Jan. 15, 2019

(65) Prior Publication Data

US 2019/0217456 A1    Jul. 18, 2019

Related U.S. Application Data

(60) Provisional application No. 62/617,591, filed on Jan. 15, 2018.

(51) Int. Cl.

| B25B 27/00 | (2006.01) |
|---|---|
| B25B 27/02 | (2006.01) |
| B25B 11/00 | (2006.01) |
| B23Q 3/00 | (2006.01) |
| B25B 3/00 | (2006.01) |
| B23P 11/00 | (2006.01) |
| B23P 11/02 | (2006.01) |
| B25B 1/00 | (2006.01) |
| B23P 19/00 | (2006.01) |
| B23P 15/10 | (2006.01) |

(52) U.S. Cl.
CPC .............. *B25B 27/02* (2013.01); *B23P 11/00* (2013.01); *B23P 11/022* (2013.01); *B23P 15/10* (2013.01); *B23P 19/00* (2013.01); *B23Q 3/00* (2013.01); *B25B 1/00* (2013.01); *B25B 3/00* (2013.01); *B25B 11/00* (2013.01)

(58) Field of Classification Search
CPC .. B25B 11/00; B25B 1/00; B25B 3/00; B25B 27/02; B23P 11/00; B23P 15/10; B23P 19/00; B23Q 3/00
USPC ......... 269/24–32, 228, 20; 29/252, 238–239, 29/280, 256, 244, 255, 251, 278, 271; 254/93 R
See application file for complete search history.

(56) References Cited

U.S. PATENT DOCUMENTS

| 6,886,227 B1 * | 5/2005 | Hedrick | ................. B25B 27/02 29/252 |
| 8,997,322 B1 * | 4/2015 | Barquist | ................. B23P 19/02 29/244 |

FOREIGN PATENT DOCUMENTS

WO    WO-2009025539 A1 *    2/2009    ........... B25B 27/026

* cited by examiner

*Primary Examiner* — Monica S Carter
*Assistant Examiner* — Katina N. Henson
(74) *Attorney, Agent, or Firm* — Mark Young, P.A.

(57) ABSTRACT

A compact pulley puller includes a hollow cylindrical barrel with a gland at each end, a hub clamp formed on each gland, a rod and a piston. Each hub clamp grips a particular size hub of a pulley to be removed or installed. The rod of the puller extends against the shaft of a pulley to remove the pulley. To install a pulley, the rod is threadedly secured to the shaft of the pulley, and the rod of the puller is retracted.

20 Claims, 12 Drawing Sheets

COMPACT PULLEY PULLER

RELATED APPLICATION

This application is a nonprovisional and claims the benefit of priority of U.S. Provisional Application 62/617,591 filed Jan. 15, 2018, the entire contents of which are incorporated herein by this reference and made a part hereof.

FIELD OF THE INVENTION

This invention relates generally to motor vehicles, and, more particularly, to a compact pulley puller that is effective within the confines of an engine compartment.

BACKGROUND

A hydraulic power steering pump is driven by a belt trained over a power steering pump pulley. As the pulley is driven and begins to spin, it turns an input shaft which turns a pumping mechanism that creates pressure inside the pump housing. This pressure is applied to the hydraulic fluid inside the lines that connects the pump to the steering gear box. When the power steering pump pulley wears out, it may display a few common warning signs that indicate service is needed. The pulley may produce a whining sound, the power steering may feel tight when driving, or the pulley may be noticeably damaged, such as when a belt breaks.

Heretofore, replacing a power steering pulley required removal of the power steering pump from the engine compartment or removal of other components, such as a cooling fan and radiator, to provide clearance for a puller. While pulley pullers have existed for some time, none was compact enough to work within the confines of a modern engine compartment without removing equipment.

A pulley puller that is compact and capable of working within the confines of a modern engine compartment is needed. The puller should be easy to use, reliable and cost effective. The puller should work with existing tools owned by auto mechanics.

The invention is directed to overcoming one or more of the problems and solving one or more of the needs as set forth above.

SUMMARY OF THE INVENTION

To solve one or more of the problems set forth above, in an exemplary implementation of the invention, a compact pulley puller is provided. The puller includes a hollow cylindrical barrel with a gland at each end, a hub clamp formed on each gland, a rod and a piston. Each hub clamp grips a particular size hub of a pulley to be removed or installed. The rod of the puller extends against the shaft of a pulley to remove the pulley. To install a pulley, the rod is threadedly secured to the shaft of the pulley, and the rod of the puller is retracted.

More specifically, a compact pulley puller according to principles of the invention includes a hollow cylinder having a first end, a second end opposite the first end, an interior, and an internal diameter. A piston has a circular periphery and a diameter that is less than (but close to) the internal diameter of the hollow cylinder. The piston has a first piston side and a second piston side opposite the first piston side. The first piston side is between the second piston side and the first end of the cylinder. The second piston side is between the first piston side and the second end of the cylinder. The piston is disposed and moveable linerally within the hollow interior of the cylinder. A seal is provided at the circular periphery of the piston and extends from the piston to the cylinder.

A first gland is provided at the first end of the cylinder. The first gland has an exterior side, an interior side opposite the exterior side, and a first central aperture. The first central aperture is concentric with the cylinder.

A second gland is provided at the second end of the cylinder. The second gland has an exterior side, an interior side opposite the exterior side, and a second central aperture. The second central aperture is concentric with the cylinder.

A plurality of ports are provided in the cylinder. The ports extend to the hollow interior of the cylinder. The ports includes a first port adjacent to the first gland and a second port adjacent to the second gland. A third port may also be provided adjacent to the first gland (e.g., opposite the first port). A fourth port may also be provided adjacent to the second gland (e.g., opposite the second port). In one embodiment, grease fittings are attached to the first and second ports and manual valves attached are attached to the third and fourth ports.

A grease gun may be coupled to either grease fitting, while the manual valve near the opposite end of the cylinder is opened. Forcing grease from the grease gun through the grease fitting into the cylinder forces the piston towards the gland near the opened manual valve. High pressure and, therefore, high force can be achieved with conventional grease guns.

A rod is attached to the piston. The rod has a first end and a second end opposite the first end. The rod has a first half and a second half. The first half of the rod projects (i.e., extends) from the first piston side. The second half of the rod projects from the second piston side. The rod extends through the glands. The first end of the rod extends through the first central aperture of the first gland. The second end of the rod extends through the second central aperture of the second gland. The rod is concentric with the cylinder.

A first hub clamp is attached to the exterior side of the first gland. The first hub clamp includes a first sleeve having a proximal end attached to the exterior side of the first gland and a distal end opposite the proximal end. The first sleeve is concentric with the first central aperture. A first flange is provided at the distal end of the sleeve. The first flange has a proximal side and a distal side opposite the proximal side of the first flange. The proximal side of the first flange is between the distal side of the first flange and the exterior side of the first gland. A first sleeve aperture (e.g., slot or gap) extends through a portion of the first sleeve. A first flange aperture extends through a portion of the first flange, in alignment with the first sleeve aperture. These apertures allow a flanged hub of a pulley to be received in, by sliding into, the clamp. The first end of the rod is linearly movable between the exterior side of the first gland and the distal side of first flange of the first hub clamp.

A second hub clamp is attached to the exterior side of the second gland. The second hub clamp includes a second sleeve having a proximal end attached to the exterior side of the second gland and a distal end opposite the proximal end. The second sleeve is concentric with the second central aperture. A second flange is provided at the distal end of the sleeve. The second flange has a proximal side and a distal side opposite the proximal side of the second flange. The proximal side of the second flange is between the distal side of the second flange and the exterior side of the second gland. A second sleeve aperture (e.g., slot or gap) extends through a portion of the second sleeve. A second flange aperture extends through a portion of the second flange, in alignment with the second sleeve aperture. These apertures allow a flanged hub of a pulley to be received in, by sliding into, the clamp. The second end of the rod is linearly movable between the exterior side of the second gland and the distal side of second flange of the second hub clamp.

Each hub clamp may be integrally formed with the respective gland. Alternatively, each hub clamp may be separately formed in one or more pieces that are later assembled and attached to a gland.

A side of the exterior surface of the cylinder, extending from one end of the cylinder to the other end of the cylinder, is planar (i.e., flat). None of the plurality of ports extends through the planar side. Thus, the puller may be laid on a table or shelf, without rolling, whether or not the grease fittings and valves are installed.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
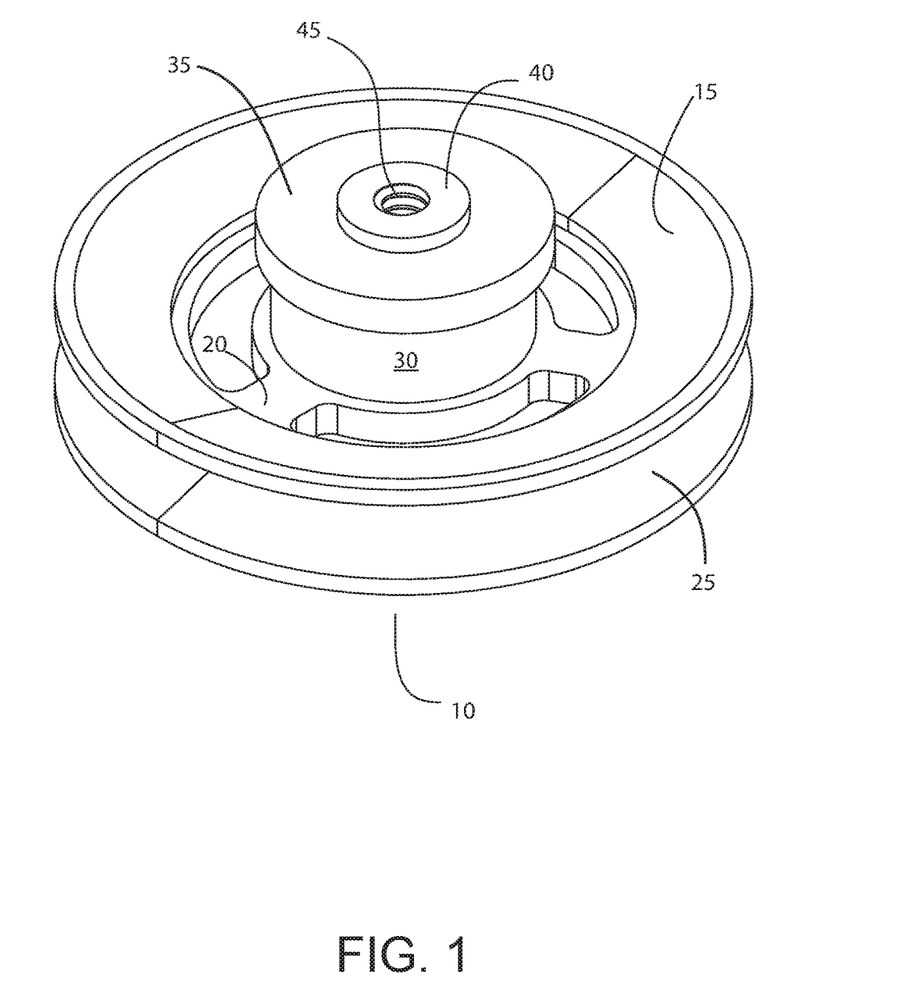
FIG. 1 is a perspective view of an exemplary pulley on a drive shaft.

A nonlimiting example of a pulley 10 on a shaft 40 is conceptually illustrated in FIG. 1. The pulley 10 includes a cylindrical hub 30 with an outer flange 35. A plurality of spokes 20 extend from the hub 30 to a rim 15. One or more grooves 25 are formed in the outer periphery of the rim 15. During use, a drive belt engages the outer peripheral groove 25. A drive shaft 40 of a device (e.g., a power steering pump) extends through the hub 30. The drive shaft 40 includes a central cylindrical channel or compartment 45 with female threads. A puller according to principles of the invention may remove from the shaft 40 and reinstall on the shaft 40 such a pulley 10 in the confines of an engine compartment without removing other equipment from the engine compartment.

A compact pulley puller 100 according to principles of the invention is less than 5 inches in length, preferably less than about 4.5 inches in length, and more preferably not more than 4.25 inches in length, l, as shown in FIG. 1. The compactness allows the puller to fit in tight confined spaces of an engine compartment, without having to remove components from the engine compartment to make room for the puller. In an exemplary implementation, the puller has a diameter, d, of about 3 inches. However, that diameter is not particularly important, as engine compartments tend to provide space for a larger diameter device.

A compact pulley puller according to principles of the invention is comprised of a hydraulic cylinder 115 (FIGS. 1-4), with glands 120, 125 at opposite ends. Each gland has a central opening (aperture) through which the rod 105 extends. The glands 120, 125 may be held in place using mechanical fasteners, such as, but not limited to, snap rings 180, 182 and 188, 190. Inner and outer o-rings (seals) 150, 155 and 170, 175 are provided for each gland, 120, 125.

Each gland is equipped with a hub coupling 127 or clamp. The hub coupling 127 may be integrally formed with the gland or a separate structure that is permanently or removably attached to the gland. The hub coupling 127 slides onto and grips a hub 30 of a pulley. One gland 120 may have a hub coupling of a first size, and the other gland 125 may have a hub coupling of a second size. In this manner, the puller 100 may accommodate hubs of varying sizes.

The hydraulic cylinder 115 is a cylindrical barrel that contains a piston 110. The cylinder 115 defines a volume in which the piston 110 travels linearly. The cylinder 115 also provides ports for 140, 142, 144, 145 (e.g., threaded ports) for admitting and evacuating fluid or grease. The cylinder 115 also provides threads or grooves 250, 251, 252, 253 (FIGS. 9 and 10) for receiving retaining rings 180, 182, 188, 190. The exemplary hydraulic cylinder 115 includes opposite open ends into which the glands 120, 125 are fitted and secured between retaining rings 180, 182, 188, 190 retained in grooves 250, 251, 252, 253.

The piston 110 is a cylindrical or disc-like structure. The piston 110 is made liquid-tight by a piston ring, which in the exemplary embodiment is an O-ring 165 partially fitted into a groove around the outer periphery of the piston 110. The piston 110 transfers force from grease or liquid forced (i.e., pumped) into either compartment (e.g., 130 or 132) in the cylinder 115 to the rod 105. As the compartment is filled with grease or liquid under high pressure, the piston 110 moves towards the other compartment. Such movement of the piston 110 forces grease or liquid out of such other compartment.

The piston 110 is attached to a piston rod (shaft) 105. The piston 110 is either integrally formed with the piston rod (e.g., by casting and/or machining) 105, or mechanically attached to the piston rod 105, using mechanical fasteners, such as, but not limited to, snap rings, threads or welds. If mechanically attached to the piston rod, the piston 110 includes inner and outer o-ring seals 160, 165. If integrally formed, the piston includes an outer o-ring seal 165. As the piston 110 moves linearly within the cylinder 115 under the influence of hydraulic pressure, the rod 105 moves linearly.

The space in the cylinder 115 between the gland 125 and piston 110 is a compartment 130. Likewise, the space in the cylinder 115 between the gland 120 and piston 110 is a compartment 132. Compartment 130 and compartment 132 are on opposite sides of the piston. As the piston 110 moves, the volume of each compartment 130, 132 changes between a maximum and minimum volume, each of which is less than the volume of the cylinder 115. In use, grease or fluid is forced into one compartment (e.g., compartment 130) while any grease or fluid in the other compartment (e.g., compartment 132) is allowed to evacuate through a port (e.g., port 142).

Figure 5:
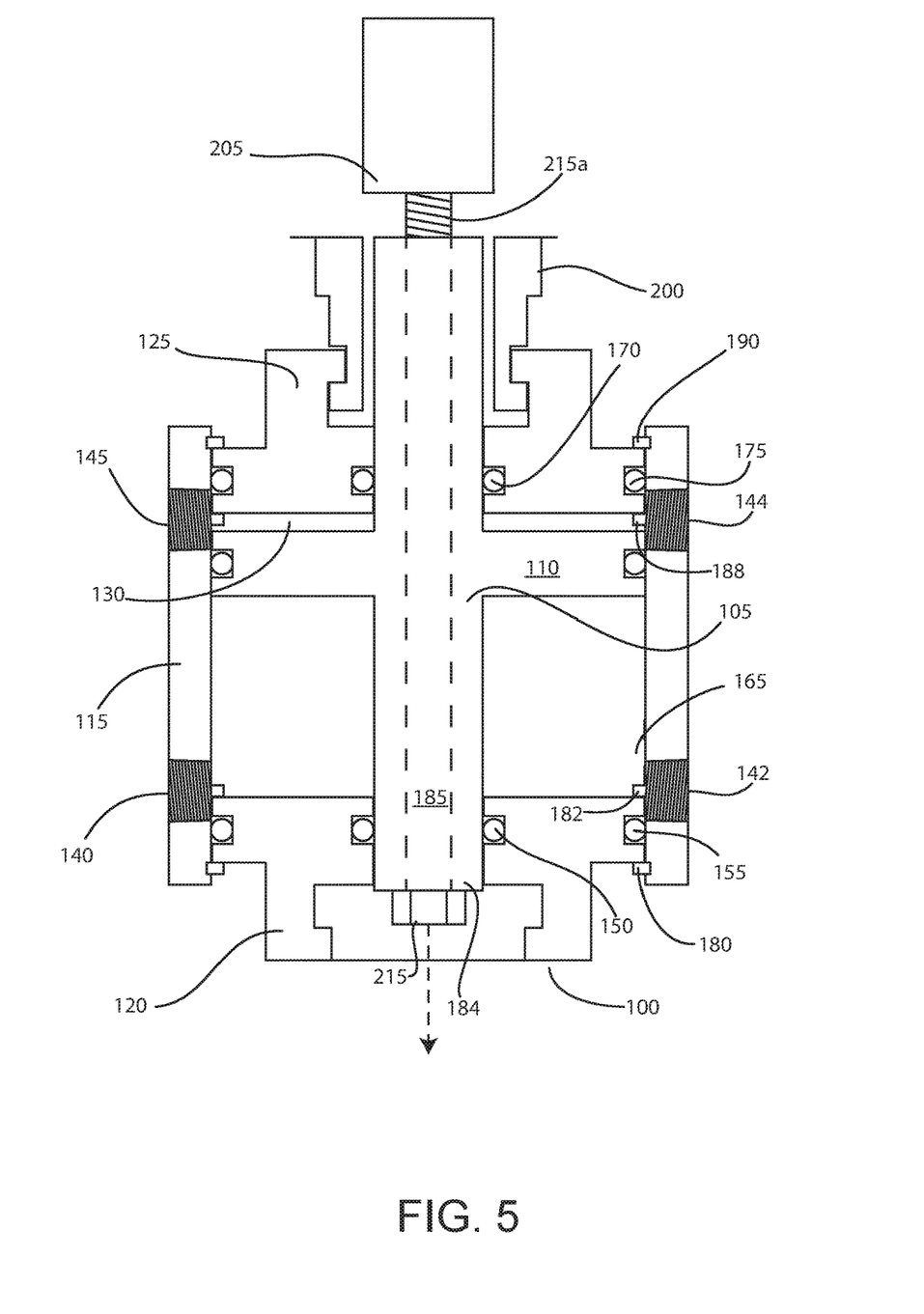
FIG. 5 is a 2D schematic of an exemplary puller engaging a hub of a pulley and threadedly engaging a shaft for installing the pulley on the shaft according to principles of the invention.

A rod 105 extends through or projects from both sides the piston 110 at the center of the piston. The rod 105 and piston 110 are concentric. The rod 105 transfers force from movement of the piston 110 to a shaft 40 on which a pulley 200 is mounted. The exemplary rod 105 is a hollow cylinder, having a central channel 185 that extends form one end of the rod 105 to the opposite end of the rod 105. A bolt 215 may be extended through the channel 185 with the threaded end of the shank 215a of the bolt 215 threaded into a threaded compartment 45 of a shaft 40, 205, to install a pulley 200 on the shaft 40, 205, as conceptually illustrated in FIGS. 1 and 5. Movement of the piston 110 causes the piston rod 105 to move linearly. The linear movement of the rod 105 can pull a threadedly secured shaft 40, 205 through a hub 30, 200 of a pulley 10 to install the pulley 10 on the shaft 40, 205. Linear movement of the rod 105 in the opposite direction can pull a hub 30, 200 of a pulley off of a shaft 40, 205 to remove the pulley 10 from a shaft 40, 205. In removing the pulley 10, a bolt 215 does not have to be threaded into the shaft 40, 205 or extended through the central channel 185

The hydraulic cylinder 115 includes at least two ports (e.g., ports 140, 145), one port leading to each compartment 130, 132. Each port may be threaded (e.g., with standard NPT threads) to enable threaded attachment of valves, fittings and lines. In an embodiment with two ports, one port (e.g., port 145) allows flow of fluid or grease into and out of compartment 130 and another port (e.g., port 140) allows flow of fluid or grease into and out of compartment 132. When fluid or grease is forced through port 145 into compartment 130 to advance the piston 110 towards gland 120, fluid or grease that was contained in compartment 132 is forced out of that compartment through a port (e.g., port 140) by the advancing piston 110.

The embodiment depicted in the figures includes four ports 140, 145 and 142, 144. Two ports 144, 145 allow flow of fluid or grease into and out of compartment 130 and the other two ports 140, 142 allow flow of fluid or grease into and out of compartment 132. One port per compartment may be used as an inlet, such as port 140 for compartment 132, and port 145 for compartment 130. One port per compartment may be used as an outlet, such as port 142 for compartment 132, and port 144 for compartment 130.

Valves may be connected to ports. Each exemplary port 140, 142, 144, 145 is threaded. The threads may be, by way of example and not limitation, American National Standard Pipe Thread (NPT threads). Threads facilitate connecting valves, such as (but not limited to) zerk fittings (aka grease fittings), stopcocks or ball valves to control grease and/or fluid flow through a port. Various fittings may also be connected via the threads.

The exemplary puller 100 includes a plurality of O-rings 150, 155, 165, 170, 175. Each O-ring is a mechanical gasket in the shape of a torus. Each O-ring may be a loop of elastomer with a round cross-section, designed to be seated in a groove and compressed during assembly between two parts, creating a seal at the interface. In the embodiment of FIGS. 1 through 5, the piston 110 includes an outer O-ring 110 to provide a seal at the interface of the piston 110 and cylinder 115. Also in the embodiment of FIGS. 1 through 5, each gland 120, 125 includes an inner 150, 170 and outer 155, 175 O-ring. Each outer O-ring 155, 175 provides a seal at the interface of the gland 120, 125 and cylinder 115. Each inner O-ring 150, 170 provides a seal at the interface of the gland 120, 125 and rod 105. In an alternative embodiment, discussed below, the interior side of each gland 120, 125 may include a cavity in which a ring seal may be pressed to provide a seal at the interface of the gland 120, 125 and rod 105.

The exemplary puller 100 includes a plurality of retaining rings 180, 182, 188, 190. Each exemplary retaining ring is a circlip, also known as a C-clip or snap ring. Each retaining ring is a semi-flexible metal ring with open (i.e., separate) ends which can be snapped into place, into a machined groove, to prevent lateral movement. There are two basic types: internal and external, referring to whether they are fitted into a bore or over a shaft. All of the retaining rings in the embodiment of FIGS. 1-5 are internal circlips fitted into a groove in the cylinder 115 to prevent lateral movement of a gland 120, 125. Gland 120 is restrained between outer retaining ring 180 and inner retaining ring 182. Gland 125 is restrained between outer retaining ring 190 and inner retaining ring 188. As the retaining rings are stamped out of sheet metal, they have a smooth side and a rough side. Each retaining ring is preferably installed with the smooth side facing the gland 120, 125. Retaining rings may be installed and removed with pliers having tips that fit through small apertures in the ends of the clip.

Figure 2:
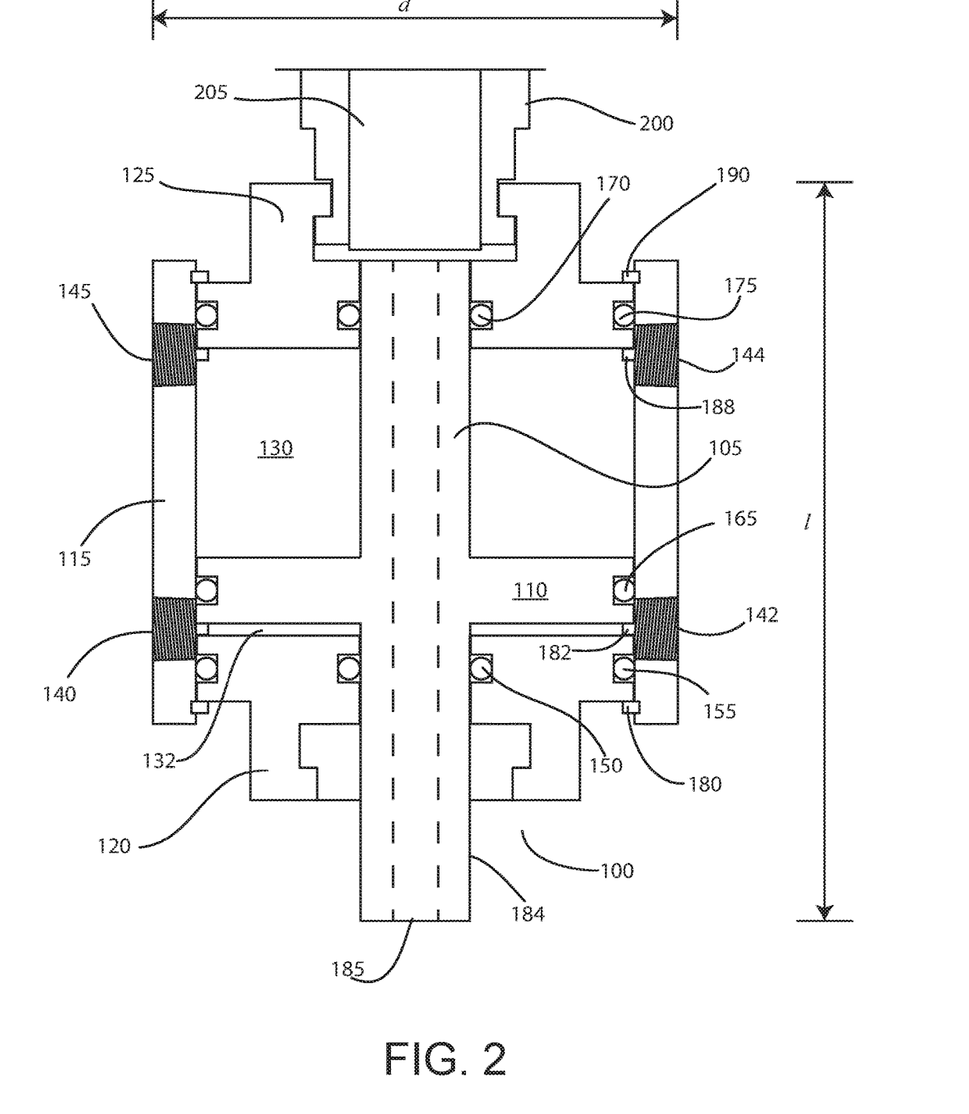
FIG. 2 is a 2D schematic of an exemplary puller engaging a hub of a pulley according to principles of the invention.
Figure 3:
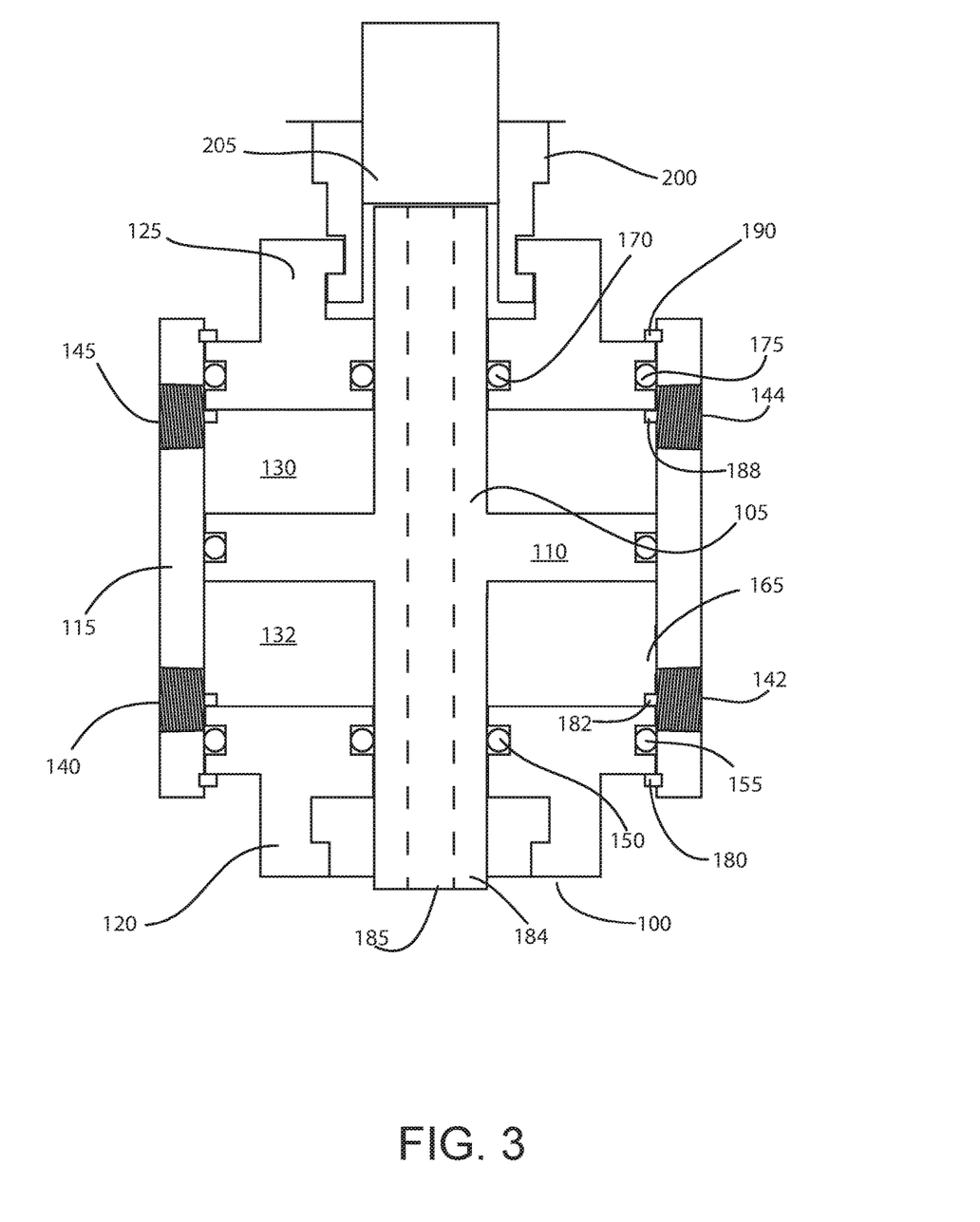
FIG. 3 is a 2D schematic of an exemplary puller engaging a hub of a pulley with the pulley partially removed from a shaft according to principles of the invention.
Figure 4:
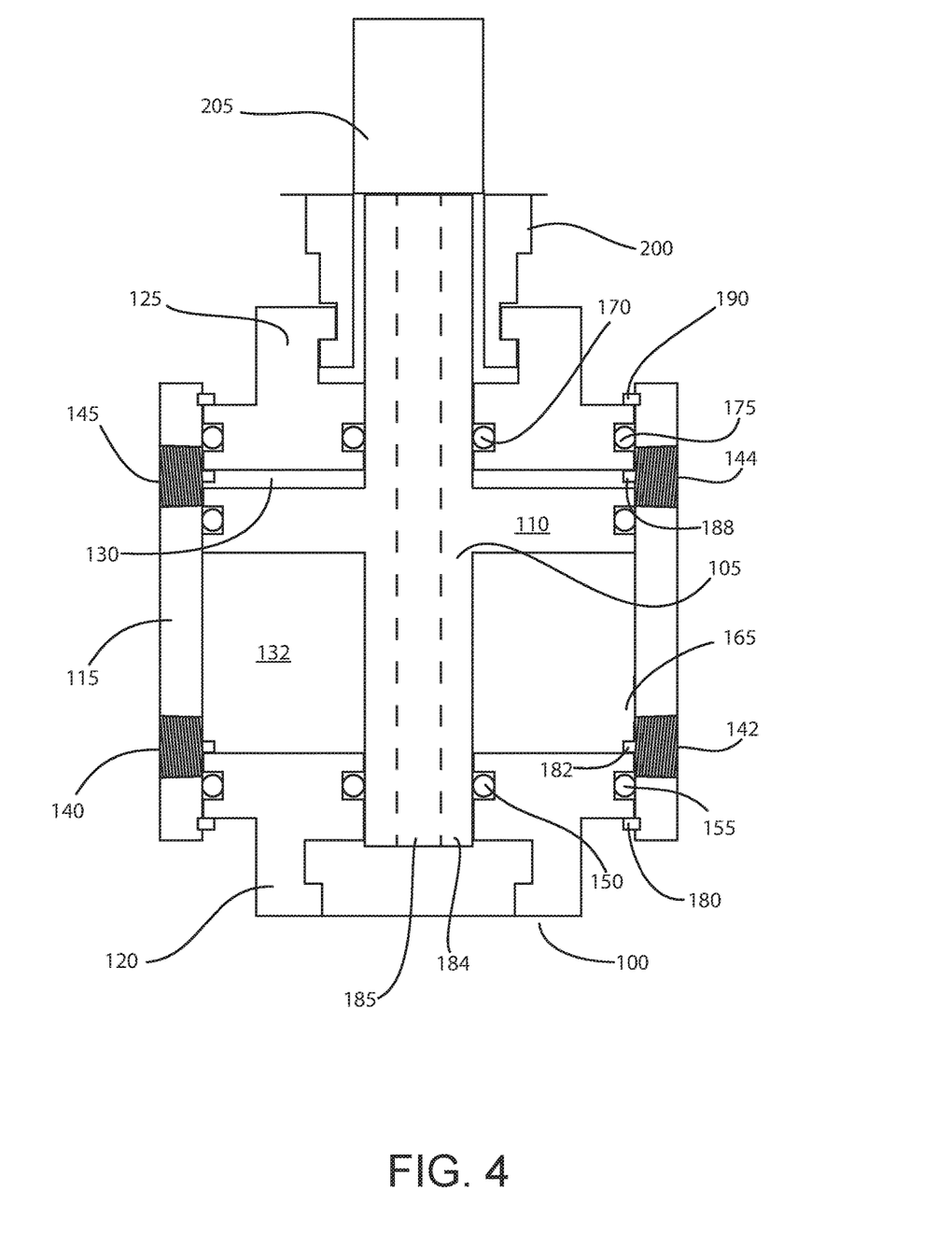
FIG. 4 is a 2D schematic of an exemplary puller engaging a hub of a pulley with the pulley removed from a shaft according to principles of the invention.

To remove a pulley, a hub 30 is clamped by the hub coupling by sliding the hub 30 into the space 127 of the hub coupling 122. The piston rod 105 is advanced against the pulley shaft 40, by applying pressurized hydraulic fluid or grease to a compartment 132 on one side of the piston. As the piston rod 105 extends from the gland 125, the hub 30 of the pulley is drawn off the pulley shaft 40, as shown in FIGS. 2 through 4, which represent a sequence.

A channel 185 extends through the piston rod 105. The channel 185 allows threaded coupling 215 (FIG. 5) between the piston rod 105 and a shaft 40 of a pulley. Pulley shafts typically include a threaded channel to facilitate re-installation of a pulley on the shaft. Thus, a bolt 215 may extend through the channel 185 of the rod 105, thread into the shaft 40 and, thereby, connect the piston rod 105 to the pulley shaft 40 during installation of a pulley on the shaft 40.

To install a pulley, a threaded bolt connects the piston rod 105 to the pulley shaft 40, while the hub coupling clamps the hub 30 of the removed pulley in alignment with the pulley shaft 40. As the piston rod 105 is moved towards the opposite gland 120, the hub 30 is forced onto the pulley shaft 40.

Figure 6:
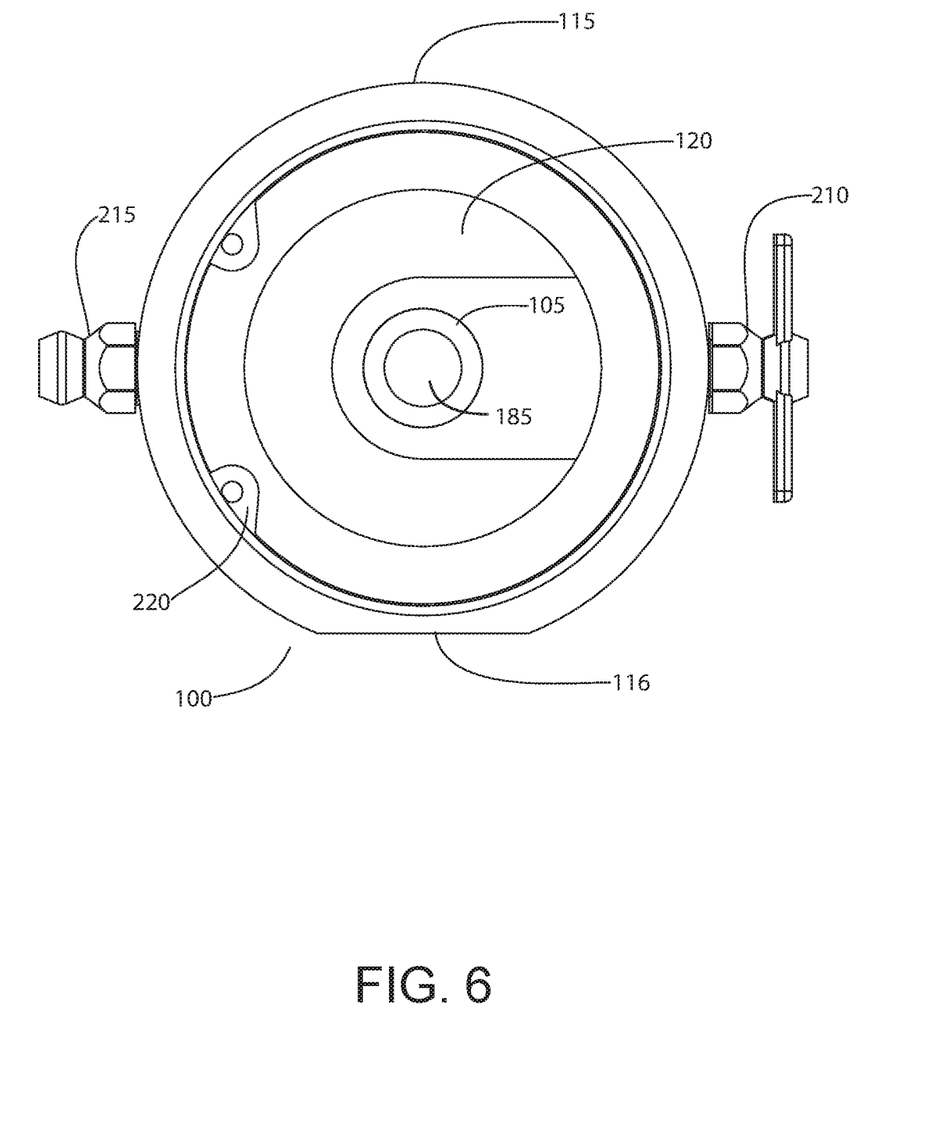
FIG. 6 is a front view of an exemplary puller according to principles of the invention.
Figure 7:
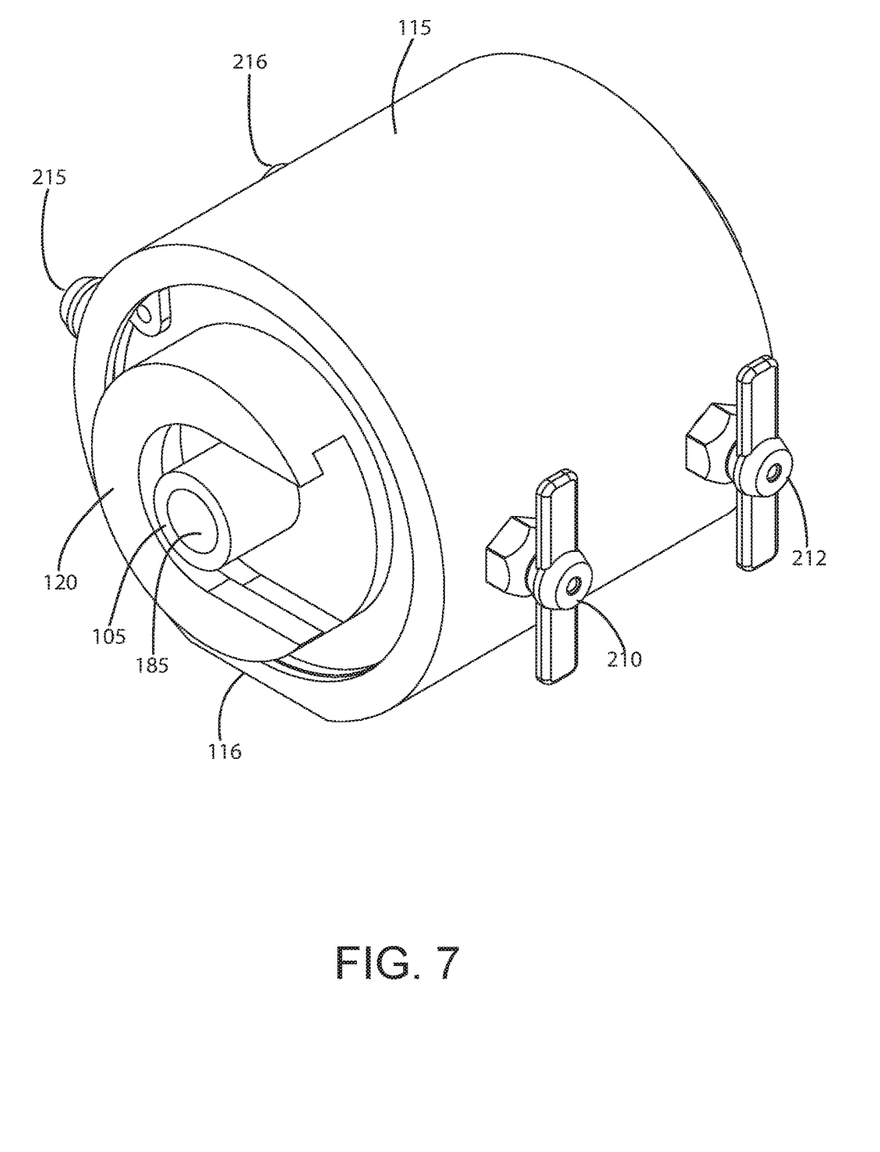
FIG. 7 is a first perspective view of an exemplary puller according to principles of the invention.
Figure 8:
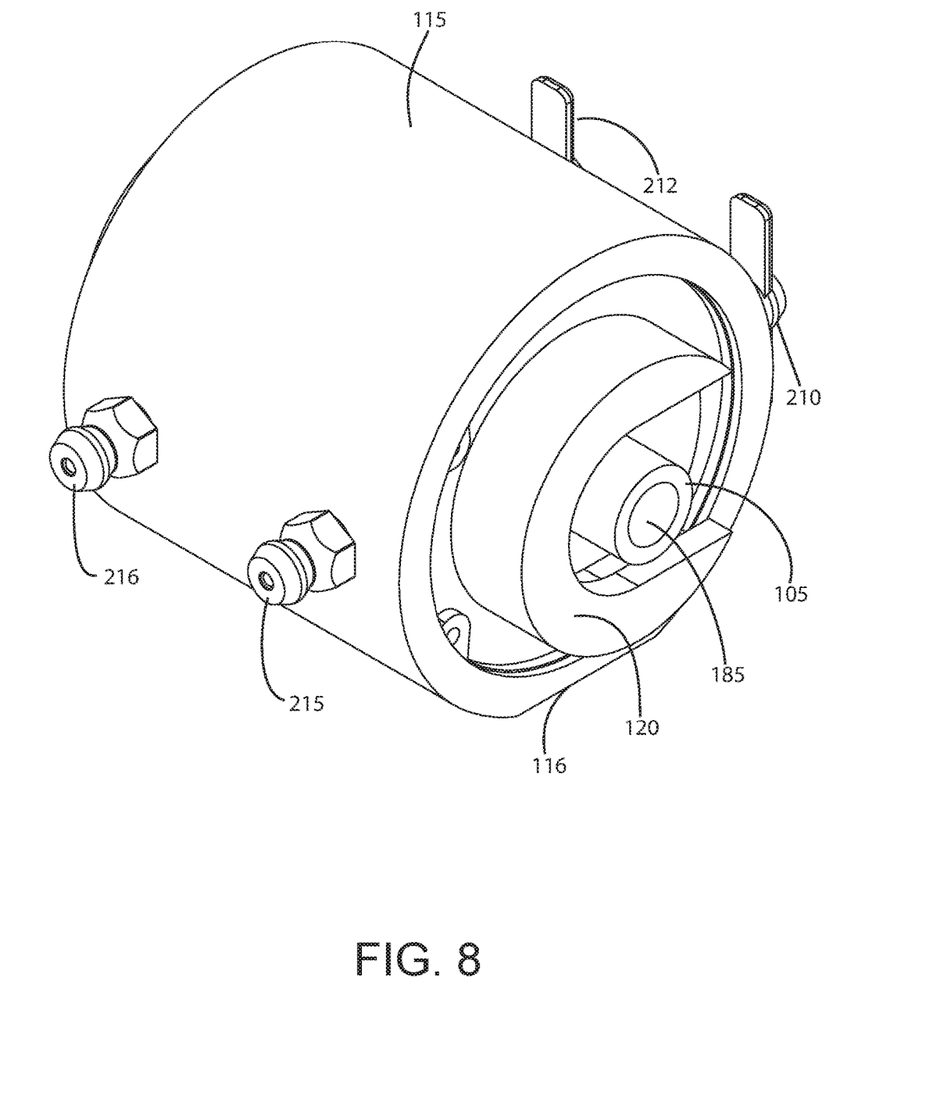
FIG. 8 is a second perspective view of an exemplary puller according to principles of the invention.

FIGS. 6 through 8 provide exterior views of an exemplary puller 100. The exemplary puller includes a pair of grease fittings 215, 216 (aka zerk fittings) and a pair of manual valves 210, 212, such as stopcocks, needle valves, plug valves, ball valves or any other valves that control flow of grease and/or hydraulic fluid. Grease fitting 215 is threaded into inlet port 140 for compartment 132. Grease fitting 216 is threaded into inlet port 145 for compartment 130. Stopcock 210 is threaded into port 142 for compartment 132. Stopcock 212 is threaded into port 144 for compartment 130.

Each grease fitting 215, 216 has a nipple to which a grease gun attaches. Pressure supplied by a grease gun forces a small captive bearing ball in the grease fitting to move back against the force of a retaining spring. The arrangement is thus essentially a valve that opens under pressure to allow grease to pass through a channel and be forced into the corresponding compartment 130, 132. When the pressure ceases, the ball returns to its closed position. The ball thus excludes dirt and functions as a check valve to prevent grease escaping back out of the fitting. The ball is almost flush with the surface of the fitting so that it can be wiped clean to reduce the amount of debris carried with the grease into the compartment 130, 132.

In use, grease is forced into a compartment through one grease fitting associated with one compartment, while the stopcock associated with the other compartment is opened. As grease is forced into a compartment, the piston travels towards the other compartment. The opened stopcock allows grease to escape from such other compartment.

In another embodiment, in lieu of valves 210, 212, threaded plugs may be provided. The plugs thread into ports 142, 144. To evacuate hydraulic fluid or grease from a compartment, the plug is removed from the port for that compartment.

Figure 14:
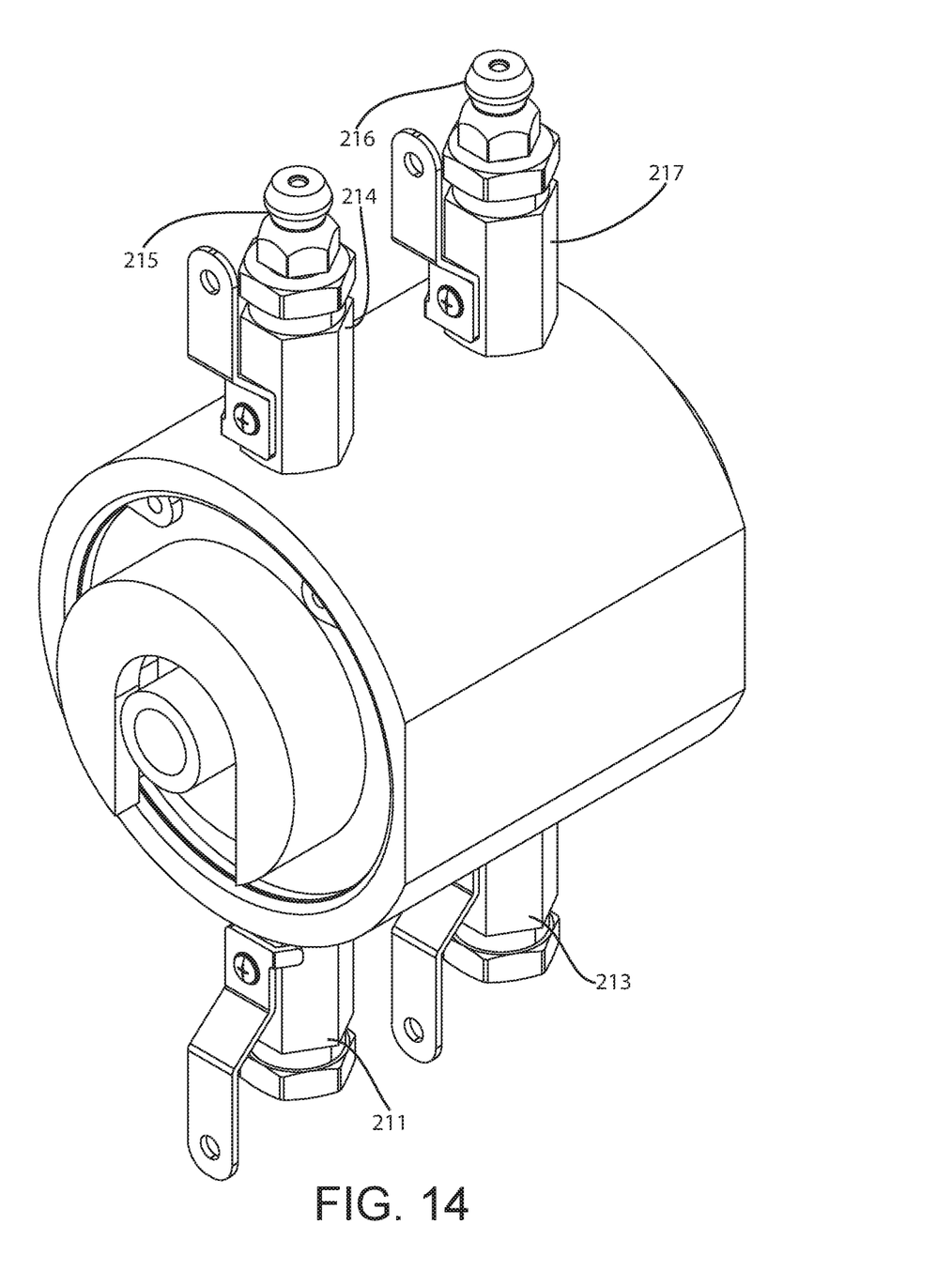
FIG. 14 is a perspective view of an exemplary puller with an alternative valve configuration according to principles of the invention.

In yet another embodiment, as illustrated in FIG. 14, manual valves 211, 213, 214, 217 are provided in each port. Valves 211, 213 without grease fittings are threaded into outlet ports 142, 144. Valves 214, 217 with grease fittings 215, 216 are threaded into inlet ports 140, 145. The manual valves may, by way of example and not limitation, be plug valves or ball valves, which open the valve when the handle is pivoted to the orientation shown in FIG. 14. Each valve may be closed by pivoting the handle 90° to an orthogonal configuration. During use, if valve 214 is open, valve 213 is open and the other valves are closed. Similarly, if valve 217 is open, valve 211 is open and the other valves are closed.

Figure 9:
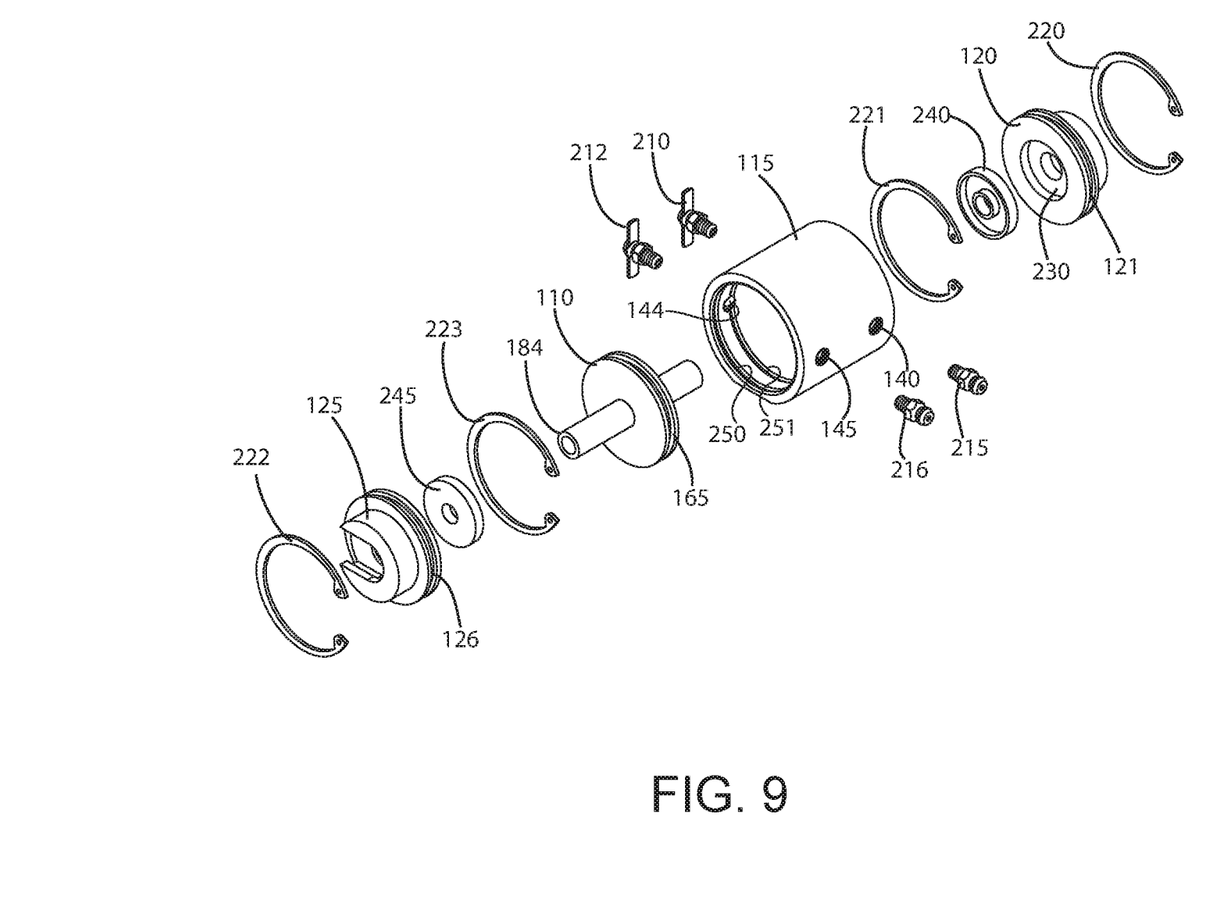
FIG. 9 is an exploded perspective view of an exemplary puller according to principles of the invention.

With reference to the exploded view of FIG. 9, rod seals 240, 245 are conceptually illustrated. The rod seals 240, 245 provide a fluid tight seal between each gland 120, 125 and the rod 105 extending through the gland 120, 125. As the rod moves linearly (i.e., reciprocates) through the rod seals 240, 245, a fluid tight seal is maintained. In the exemplary embodiment, the rod seals 240, 245 are U-cup seals pressed into a cup-shaped cavity 230 in the interior side of each gland 120, 125. Each U-cup seal includes an inner cylindrical sleeve, a concentric outer cylindrical sleeve, and a hub extending from the inner cylindrical sleeve to the outer cylindrical sleeve. To provide an effective seal, the inner diameter of the inner cylindrical sleeve is slightly less than or about the same, but no greater than, the outer diameter of the rod 105. The U-cup seal may be spring- or O-ring loaded to provide enhanced stability and sealing performance. The spring or O-ring occupies the space between the inner cylindrical sleeve and the outer cylindrical sleeve, and may bias the inner cylindrical sleeve towards the rod 105.

In lieu of a U-cup seal, another seal may be used. By way of example and not limitation, with reference to FIGS. 2 through 5, O-rings 150 and 170 (or other ring seals) are seated in grooves in the central aperture of each gland. Such ring seals may provide a fluid-tight seal between each gland 120, 125 and the rod 105.

Figure 10:
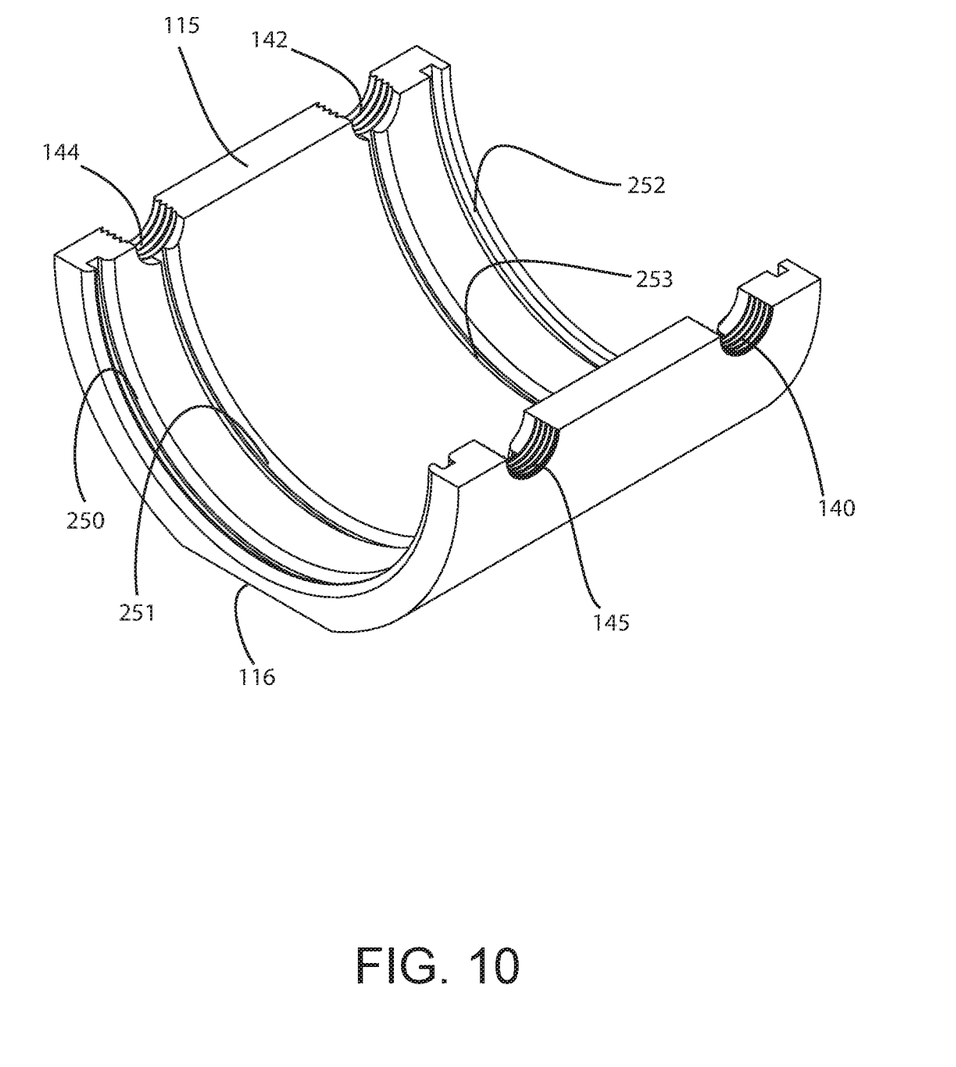
FIG. 10 is a section perspective view of an exemplary cylinder for a puller according to principles of the invention.

The section view of FIG. 10 more clearly illustrates the threaded ports 140, 142, 144, 145 and the grooves 250, 251 and 252, 253, for receiving retaining rings 222, 223 and 220, 221 that secure the glands 120, 125 in place. Additionally, in FIG. 10, a flat side 116 of the cylinder 115 is more clearly shown. The flat side 116 provides a substantially planar bottom surface, i.e., a stable surface for resting the puller 100 on a flat support surface, such as a table top. The flat side 116 is between ports 140, 145 and 142, 144. Thus, even if the grease fittings 215, 216 and valves 212, 220 are installed, the puller 100 may be rested on the flat side 116.

A puller 100 according to principles of the invention is double acting, meaning that it is powered in both extension and retraction by forcing grease or hydraulic fluid through a port (e.g., port 140 or 145) into either compartment (e.g., 132 or 130), while movement of the piston forces grease or hydraulic fluid from the other compartment (e.g., 130 or 132) through another port (e.g., port 144 or 142). Depending upon the orientation of the puller 100 relative to a pulley and the port and corresponding compartment into which grease or fluid is pumped, the puller will either pull (i.e., retract the rod 105) or push (i.e., extend the rod). Pulling action installs a clamped pulley on a threadedly engaged shaft. Pushing action removes a clamped pulley from a shaft.

An exemplary puller 100 has a gland 120, 125 at each end. Each gland has a hub clamp. Each hub clamp may be sized to engage a standard hub size. Thus, a puller according to principles of the invention may remove and install pulleys having hubs of different sizes. As the glands are removable and replaceable, a puller according to principles of the invention may configured to remove and install pulleys having hubs of many different sizes, more than two different sizes.

Figures 11, 12, 13:
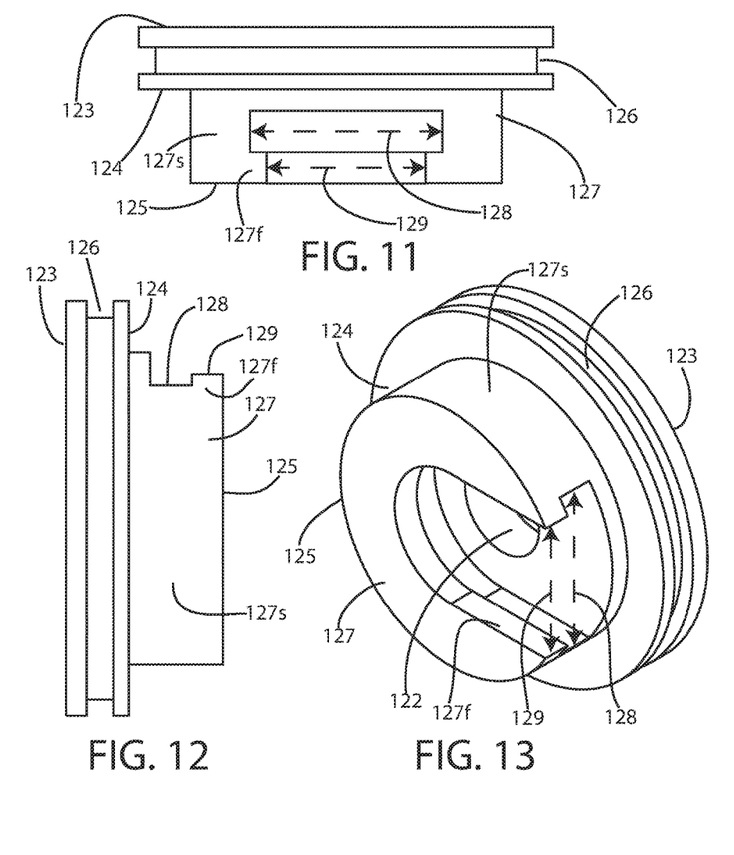
FIG. 11 is a first side view of an exemplary gland with a hub clamp for a puller according to principles of the invention.
FIG. 12 is a second side view of an exemplary gland with a hub clamp for a puller according to principles of the invention.
FIG. 13 is a perspective view of an exemplary gland with a hub clamp for a puller according to principles of the invention.

In FIGS. 11-13, various views of an exemplary gland 125 are provided. Glands 120 and 125 are identical, except for the sizes of their respective clamps. Each gland 125 includes a peripheral groove 126 into which an O-ring 175 (FIGS. 2-5) is seated. Each gland 125 includes a side 123 that faces the piston 110 and an opposite side 124 that faces the hub clamp 127. The hub clamp 127 is comprised of a cylindrical sleeve 127s that is concentric with the central bore 122 of the gland 125. The sleeve 127s includes a flanged end 127f that allows unimpeded passage of the rod 105. The cylindrical sleeve 127s extends from the outward side 124 of the gland 125 a distance that is at least equal to the thickness of an engaged portion (i.e., flange 35—FIG. 1) of a pulley hub 30. The inner diameter of the cylindrical sleeve 127 is at least as large as the outer diameter of an engaged flange 35 of a pulley hub 30. The cylindrical hub 30 of a pulley 10 has a smaller diameter than the engaged flange 35. Two apertures 128, 129 are formed in the same side of the clamp 127. One aperture 128 is formed in the sleeve 127s and is sized to allow passage of the engaged flange 35 of the pulley 10. The other aperture 129, which is smaller than aperture 128, is sized to allow passage of the cylindrical hub 30, but not passage of the flange 35. Thus, the cylindrical hub 30 may slide into the clamp 127 in the space defined by the aperture 129 in the flanged end 127f of the clamp 127, while the engaged flange 35 of the pulley 10 is received in the space defined by the aperture 128 and cylinder 127s.

Each hub clamp 127 is attached to a gland. The clamp 127 may be integrally formed with the gland. Alternatively, the clamp 127 may be a separate component that is permanently or removably attached to the gland. Permanent attachment may entail welding. Removable attachment may entail attachment via mechanical fasteners, such as screws or bolts.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A compact pulley puller comprising
a cylinder having a first end, a second end opposite the first end, a hollow interior, and an internal diameter;
a piston having a circular periphery, a piston diameter that is less than the internal diameter of the hollow cylinder, a first piston side and a second piston side opposite the first piston side, the first piston side being between the second piston side and the first end of the cylinder, and the second piston side being between the first piston side and the second end of the cylinder, and the piston being disposed and moveable lineraly within the hollow interior of the cylinder; and a seal at the circular periphery of the piston and extending to the cylinder;
a first gland at the first end of the cylinder, the first gland having an exterior side, an interior side opposite the exterior side, and a first central aperture, the first central aperture being concentric with the cylinder;
a second gland at the second end of the cylinder, the second gland having an exterior side, an interior side opposite the exterior side, and a second central aperture, the second central aperture being concentric with the cylinder;
a plurality of ports in the cylinder extending to the hollow interior of the cylinder, including a first port adjacent to the first gland, and a second port adjacent to the second gland;
a rod having a first end and a second end opposite the first end, a first half and a second half, the first half of the rod projecting from the first piston side and the second half of the rod projecting from the second piston side, and the first end of the rod extending through the first central aperture of the first gland, and the second end of the rod extending through the second central aperture of the second gland, the rod being concentric with the cylinder; and a first hub clamp attached to the exterior side of the first gland, the first hub clamp including a first sleeve having a proximal end attached to the exterior side of the first gland and a distal end opposite the proximal end, the first sleeve being concentric with the first central aperture, a first flange at the distal end of the sleeve, the first flange having a proximal side and a distal side opposite the proximal side of the first flange, the proximal side of the first flange being between the distal side of the first flange and the exterior side of the first gland, and a first sleeve aperture extending through a portion of the first sleeve, and a first flange aperture extending through a portion of the first flange in alignment with the first sleeve aperture, and the first end of the rod being linearly movable between the exterior side of the first gland and the distal side of first flange of the first hub clamp.

2. The compact pulley puller of claim 1, the first hub clamp being integrally formed with the first gland.

3. The compact pulley puller of claim 1, further comprising a second hub clamp attached to the exterior side of the second gland, the second hub clamp including a second sleeve having a proximal end attached to the exterior side of the second gland and a distal end opposite the proximal end, the second sleeve being concentric with the second central aperture, a second flange at the distal end of the sleeve, the second flange having a proximal side and a distal side opposite the proximal side of the second flange, the proximal side of the second flange being between the distal side of the second flange and the exterior side of the second gland, and a second sleeve aperture extending through a portion of the second sleeve, and a second flange aperture extending through a portion of the second flange in alignment with the second sleeve aperture, and the second end of the rod being linearly movable between the exterior side of the second gland and the distal side of second flange of the second hub clamp.

4. The compact pulley puller of claim 2, the second hub clamp being integrally formed with the second gland.

5. The compact pulley puller of claim 1, a first grease fitting attached to the first port.

6. The compact pulley puller of claim 5, a grease gun coupled to the first grease fitting.

7. The compact pulley puller of claim 5, the plurality of ports in the cylinder extending to the hollow interior of the cylinder further including a third port adjacent to the first gland, and a fourth port adjacent to the second gland; and
a second grease fitting attached to the second port; and
a third manual valve attached to the third port; and
a fourth manual valve attached to the fourth port.

8. The compact pulley puller of claim 1, the plurality of ports in the cylinder extending to the hollow interior of the cylinder further including a third port adjacent to the first gland, and a fourth port adjacent to the second gland.

9. The compact pulley puller of claim 8, the cylinder having an exterior surface with a planar side extending from the first end to the second end of the cylinder, and none of the plurality of ports extending through the planar side.

10. The compact pulley puller of claim 1, the cylinder having an exterior surface with a planar side extending from the first end to the second end of the cylinder.

11. A grease actuated pulley puller comprising
a cylinder having a first end, a second end opposite the first end, a hollow interior, and an internal diameter;
a piston having a circular periphery, a piston diameter that is less than the internal diameter of the hollow cylinder, a first piston side and a second piston side opposite the first piston side, the first piston side being between the second piston side and the first end of the cylinder, and the second piston side being between the first piston side and the second end of the cylinder, and the piston being disposed and moveable lineraly within the hollow interior of the cylinder; and a seal at the circular periphery of the piston and extending to the cylinder;

a first gland at the first end of the cylinder, the first gland having an exterior side, an interior side opposite the exterior side, and a first central aperture, the first central aperture being concentric with the cylinder;

a second gland at the second end of the cylinder, the second gland having an exterior side, an interior side opposite the exterior side, and a second central aperture, the second central aperture being concentric with the cylinder;

a plurality of ports in the cylinder extending to the hollow interior of the cylinder, including a first port adjacent to the first gland, and a second port adjacent to the second gland, and the first port admitting grease into the hollow interior between the first piston side and the first gland thereby forcing the piston towards the second gland;

a rod having a first end and a second end opposite the first end, a first half and a second half, the first half of the rod projecting from the first piston side and the second half of the rod projecting from the second piston side, and the first end of the rod extending through the first central aperture of the first gland, and the second end of the rod extending through the second central aperture of the second gland, the rod being concentric with the cylinder; and a first hub clamp attached to the exterior side of the first gland, the first hub clamp including a first sleeve having a proximal end attached to the exterior side of the first gland and a distal end opposite the proximal end, the first sleeve being concentric with the first central aperture, a first flange at the distal end of the sleeve, the first flange having a proximal side and a distal side opposite the proximal side of the first flange, the proximal side of the first flange being between the distal side of the first flange and the exterior side of the first gland, and a first sleeve aperture extending through a portion of the first sleeve, and a first flange aperture extending through a portion of the first flange in alignment with the first sleeve aperture, and the first end of the rod being linearly movable between the exterior side of the first gland and the distal side of first flange of the first hub clamp.

12. The grease actuated pulley puller of claim 11, the first hub clamp being integrally formed with the first gland.

13. The grease actuated pulley puller of claim 11, further comprising a second hub clamp attached to the exterior side of the second gland, the second hub clamp including a second sleeve having a proximal end attached to the exterior side of the second gland and a distal end opposite the proximal end, the second sleeve being concentric with the second central aperture, a second flange at the distal end of the sleeve, the second flange having a proximal side and a distal side opposite the proximal side of the second flange, the proximal side of the second flange being between the distal side of the second flange and the exterior side of the second gland, and a second sleeve aperture extending through a portion of the second sleeve, and a second flange aperture extending through a portion of the second flange in alignment with the second sleeve aperture, and the second end of the rod being linearly movable between the exterior side of the second gland and the distal side of second flange of the second hub clamp.

14. The grease actuated pulley puller of claim 12, the second hub clamp being integrally formed with the second gland.

15. The grease actuated pulley puller of claim 11, a first grease fitting attached to the first port.

16. The grease actuated pulley puller of claim 15, a grease gun coupled to the first grease fitting.

17. The grease actuated pulley puller of claim 15, the plurality of ports extending through the cylinder further including a third port adjacent to the first gland, and a fourth port adjacent to the second gland; and
a second grease fitting attached to the second port; and
a third manual valve attached to the third port; and
a fourth manual valve attached to the fourth port.

18. The grease actuated pulley puller of claim 11, the plurality of ports extending through the cylinder further including a third port adjacent to the first gland, and a fourth port adjacent to the second gland.

19. The grease actuated pulley puller of claim 18, the cylinder having an exterior surface with a planar side extending from the first end to the second end of the cylinder, and none of the plurality of ports extending through the planar side.

20. A grease actuated pulley puller comprising
a cylinder having a first end, a second end opposite the first end, a hollow interior, and an internal diameter;
a piston having a circular periphery, a piston diameter that is less than the internal diameter of the hollow cylinder, a first piston side and a second piston side opposite the first piston side, the first piston side being between the second piston side and the first end of the cylinder, and the second piston side being between the first piston side and the second end of the cylinder, and the piston being disposed and moveable lineraly within the hollow interior of the cylinder; and a seal at the circular periphery of the piston and extending to the cylinder;
a first gland at the first end of the cylinder, the first gland having an exterior side, an interior side opposite the exterior side, and a first central aperture, the first central aperture being concentric with the cylinder;
a second gland at the second end of the cylinder, the second gland having an exterior side, an interior side opposite the exterior side, and a second central aperture, the second central aperture being concentric with the cylinder;
a plurality of ports in the cylinder extending to the hollow interior of the cylinder, including a first port adjacent to the first gland, and a second port adjacent to the second gland, and the first port admitting grease into the hollow interior between the first piston side and the first gland thereby forcing the piston towards the second gland;
a rod having a first end and a second end opposite the first end, a first half and a second half, the first half of the rod projecting from the first piston side and the second half of the rod projecting from the second piston side, and the first end of the rod extending through the first central aperture of the first gland, and the second end of the rod extending through the second central aperture of the second gland, the rod being concentric with the cylinder;

a first hub clamp attached to the exterior side of the first gland;
a first grease fitting attached to the first port; and
a grease gun coupled to the first grease fitting.

* * * * *